United States Patent [19]

Zappen et al.

[11] Patent Number: 4,488,052

[45] Date of Patent: Dec. 11, 1984

[54] METHOD AND SYSTEM TO REDUCE LOW-FREQUENCY NOISE IN SEMICONDUCTOR SENSORS

[75] Inventors: Hans-W. Zappen, Bensheim; Dieter Poetsch, Ober-Ramstadt; Klaus Lehmann, Mühltal; Friedrich Zimmermann, Rossdorf; Klaus D. Müller, Weiterstadt, all of Fed. Rep. of Germany

[73] Assignee: Robert Bosch GmbH, Stuttgart, Fed. Rep. of Germany

[21] Appl. No.: 328,475

[22] Filed: Dec. 8, 1981

[30] Foreign Application Priority Data

Dec. 24, 1980 [DE] Fed. Rep. of Germany ....... 3049043

[51] Int. Cl.³ ............................................. H01J 40/14
[52] U.S. Cl. .................................. 250/578; 358/167
[58] Field of Search .............. 250/578, 214 A, 214 R; 358/167, 213

[56] References Cited

U.S. PATENT DOCUMENTS

| | | | |
|---|---|---|---|
| 4,009,334 | 2/1977 | Sypula | 358/167 |
| 4,317,134 | 2/1982 | Woo et al. | 358/213 |
| 4,412,190 | 10/1983 | Levine | 358/167 X |

*Primary Examiner*—David C. Nelms
*Assistant Examiner*—Darwin R. Hostetter
*Attorney, Agent, or Firm*—Frishauf, Holtz, Goodman & Woodward

[57] ABSTRACT

To eliminate or suppress amplifier noise in amplifiers (6, 7) connected to a semiconductor light sensor, for example of a charge coupled type, in which the noise introduced by the amplifiers has a frequency spectrum which is low with respect to the clock frequency of operation of the sensor, the minimum value signal from the light sensor, as amplified, is determined; the maximum value of the signal, as amplified, is determined; and a reference is derived based on the minimum value, for example by clamping the minimum value, or utilizing the minimum value as a dynamic reference for subtraction from the maximum value, to thereby eliminate the effect of low-frequency shift of signals due to low-frequency noise of the amplifiers; various circuits may be used, such as clamping circuits (FIG. 3), threshold or non-additive mixing circuits (FIGS. 4, 5) coupled to a subtraction stage (24), band-pass filtering and envelope demodulation (FIG. 6: 28, 29, 30) or synchronous demodulation (FIG. 7: 34, 35) using the scanning clock frequency (36, 37) for synchronous demodulation, coupled with frequency limiting the output to, for example, one-half clock frequency in a low-pass filter (39).

16 Claims, 10 Drawing Figures

METHOD AND SYSTEM TO REDUCE LOW-FREQUENCY NOISE IN SEMICONDUCTOR SENSORS

The present invention relates to a method and a system to decrease noise of transistor amplifiers which are integrated or combined with semiconductor sensors, particularly to scan video signals and in which, during any scanning interval, the output signals have a maximum and a minimum value.*

*A further source of noise may be a load resistor therefore the invention may be used also with sensors without integrated or combined amplifiers.

BACKGROUND

Opto-electronic semiconductor sensors used in scanning video systems, of the area as well as line scanning type, use charges which, in dependence on the respective brightness applied to the sensor provides for charge transfer in synchronism with clock signals applied to one or more outputs, to be then sensed as a sensing signal respresentative of the brightness of the image on the particular spot. The course of the signal within a cycling period is such that a maximum value, dependent on brightness, is always followed by a minimum value, which is independent of brightness of the particular spot which has been illuminated.

Many types of semiconductor sensors have two outputs, the output signals of which are 180° out-of-phase with respect to each other. Since the output signals from the sensors are very low, amplifiers are used which, in some types of these sensors, are already integrated with the sensor itself.

Amplifiers coupled to the sensors, particularly in view of the low output from the sensors themselves, introduce a noise signal which is additive to the actual utilization or sensed signal. This noise signal interferes with proper sensing of the sensed signal.

THE INVENTION

It is an object to substantially reduce and indeed entirely suppress the noise signal arising in amplification or in reading-out of sensed semiconductor signals.

Briefly, the minimum value derived from the sensor is utilized to provide a reference for the maximum value thereof. In accordance with one feature of the invention, the minimum is clamped to a constant voltage or to a reference level; in accordance with another feature of the invention, the maximum and minimum values are, each, detected, and the output signals of the detectors are subtracted from each other. The clock rate of scanning of the sensors is substantially higher than the frequency of the low-frequency noise; thus, in accordance with another feature, the carrier frequency can be used to derive the video signal by suppressing the base or low-frequency band of the output signals and demodulating the carrier, including the assocated side bands, in which the carrier corresponds to the scanning clock signal frequency. Synchronous demodulation, using the scanning clock frequency as the synchronizing frequency can also be used.

The method and system has the advantage that the noise level which, essentially, is of low frequency is effectively suppressed or removed.

DRAWINGS

Figure 1:
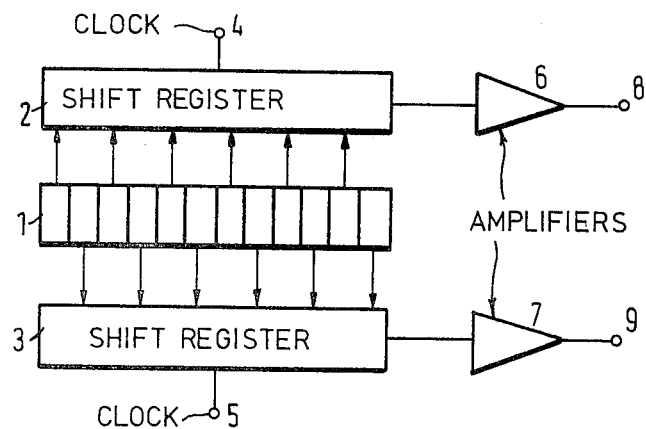
FIG. 1 is a schematic representation of a semiconductor sensor.
Figure 5:
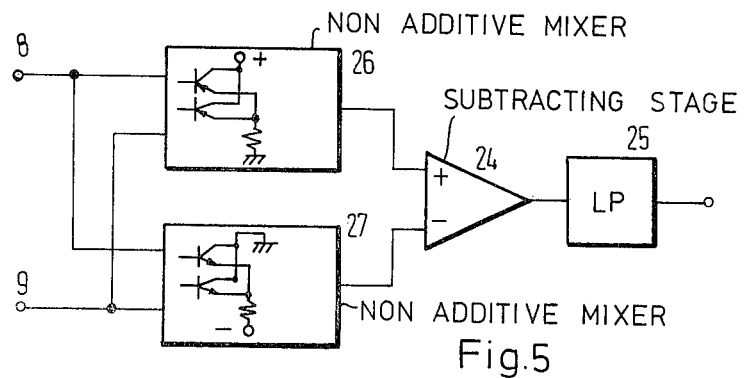
FIG. 5 is another embodiment of the system.
Figure 8A:
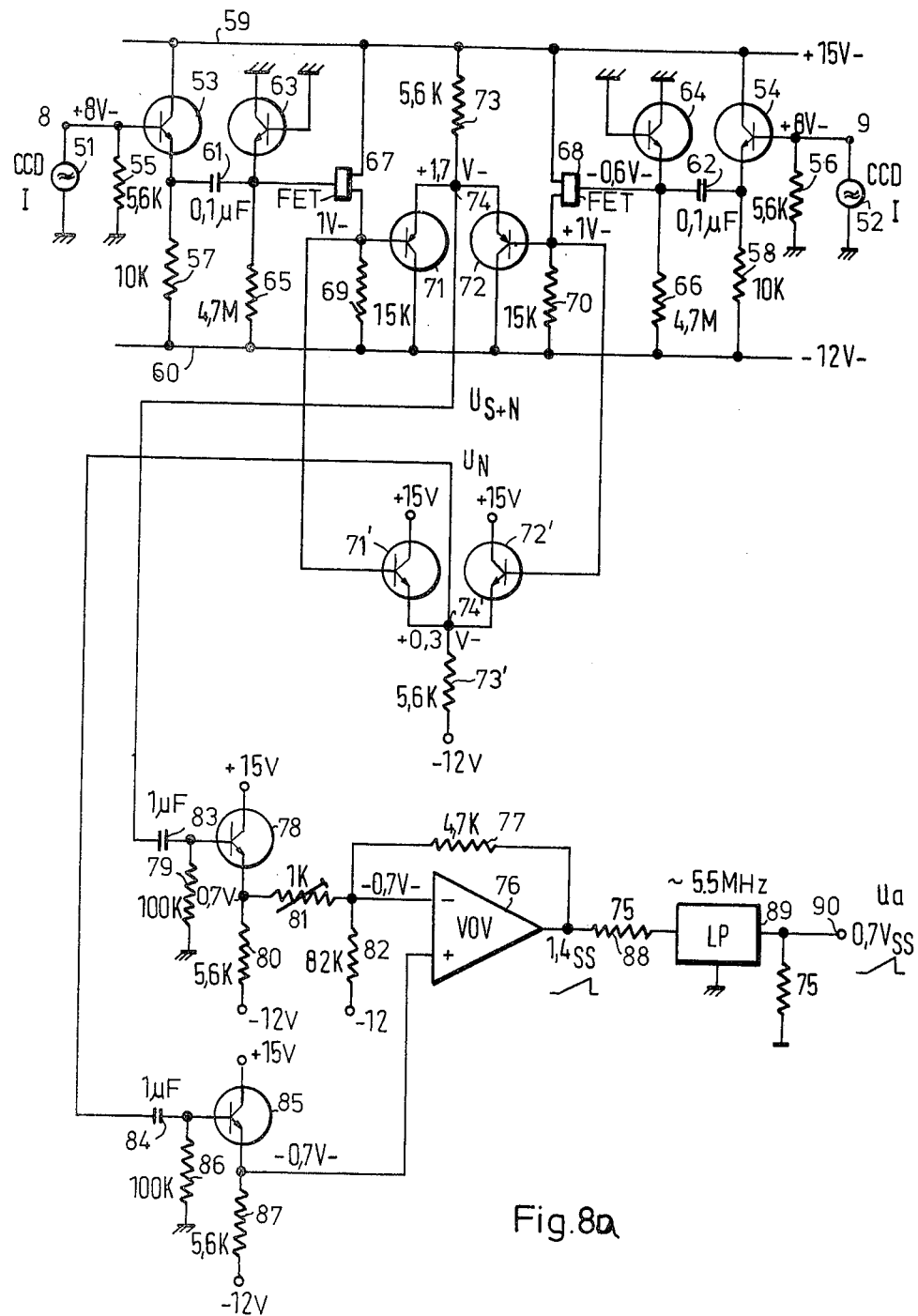
FIG. 8a is a detailed circuit diagram of the system generally shown in FIG. 5.
Figure 8B:
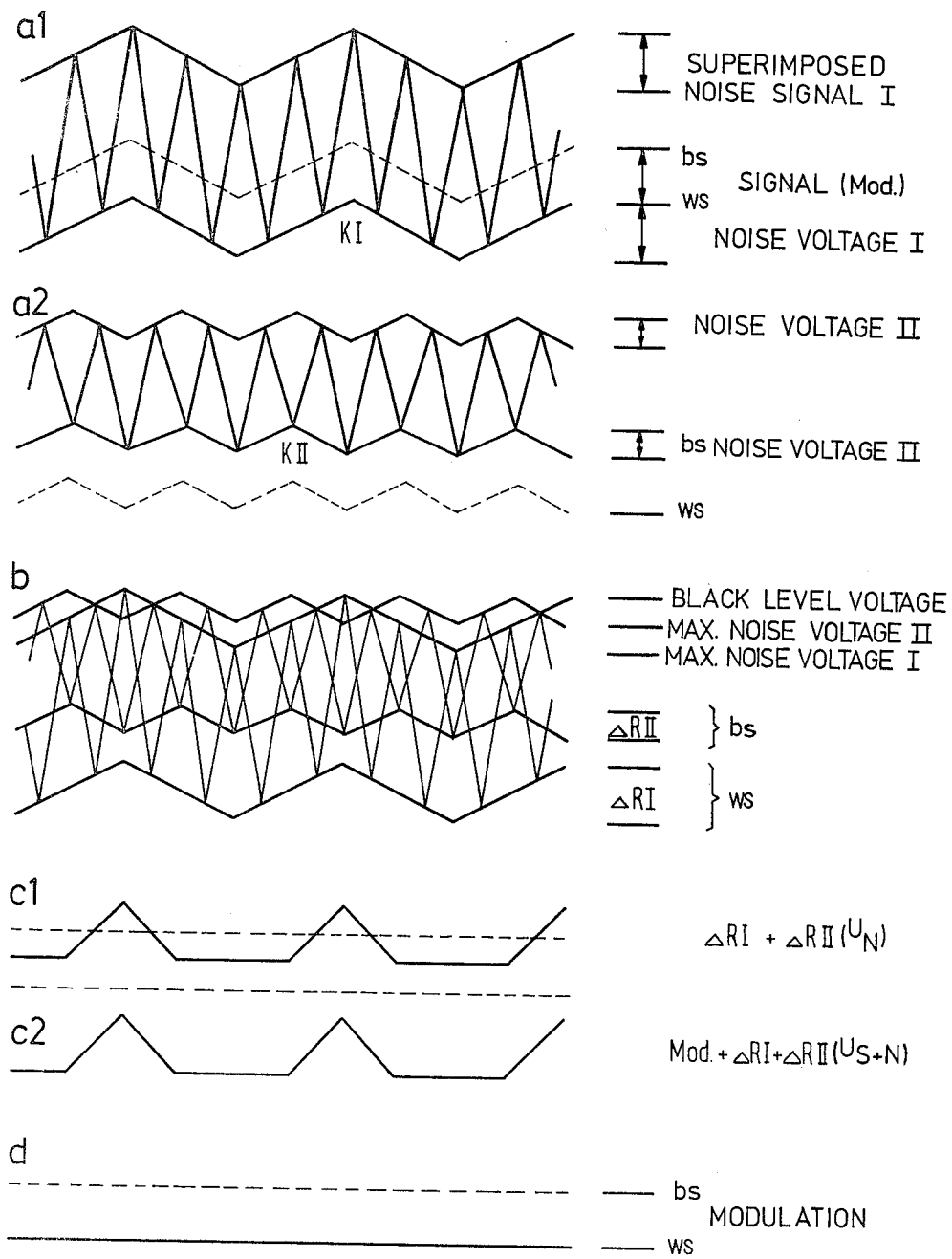

FIG. 8b, in lines a to d, is a schematic diagram in aligned time relationship illustrating various signals in the system of FIG. 5; and A semiconductor sensor 1—see FIG. 1—is placed in optically imaged relation with respect to an image to be recorded and to be analyzed to derive video signals. The sensor, for example, may be, geometrically, of areal extent, for scanning of an image projected thereon; or it may be, essentially, a line structure across which a flying spot scanner passes, for example for line-by-line scanning of motion picture film. The semiconductor sensor 1 may, for example, be of the charge coupled device type, having two outputs which are 180° out-of-phase with respect to each other. Scanning is in accordance with signals applied at clock terminals 4, 5 to respective shift registers 2, 3, which shift registers transfer the charges from the image region 1 of the sensor to the respective outputs. The outputs of the shift registers 2, 3 are connected to respective amplifiers 6, 7 to obtain output signals at terminals 8, 9. The time distribution of these signals is illustrated in FIG. 2.

Figure 2:
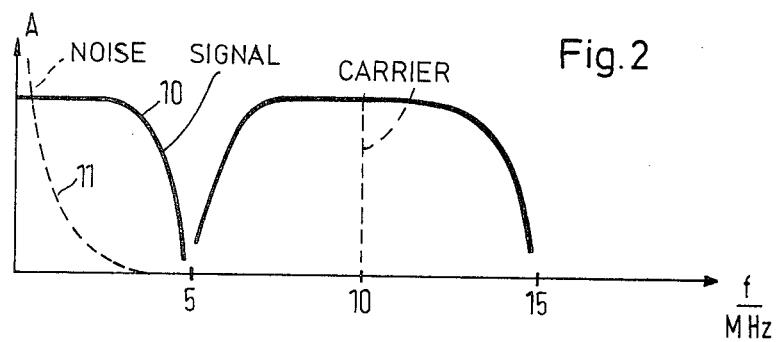
FIG. 2 is a graph of the signal and noise spectrum of the output signal from a semiconductor sensor.

The output signals have the frequency spectrum shown in FIG. 2 which, at a scanning or clock frequency of 10 MHz, covers a base band up to about 5 MHz. The video signals are obtained from the base band, customarily, by separation by a low-pass filter, so that a video signal having the spectral distribution of curve 10 is obtained. Noise signals are superimposed on this video signal 10; the spectral frequency distribution of typical noise signals in charge-coupled amplifier combinations, of the type frequently used in transducing of video signals, is shown by curve 11, in broken lines.

The spectrum of the signals at terminals 8, 9 further includes a carrier of 10 MHz, and its side bands of ±5 MHz.

Figure 3A:
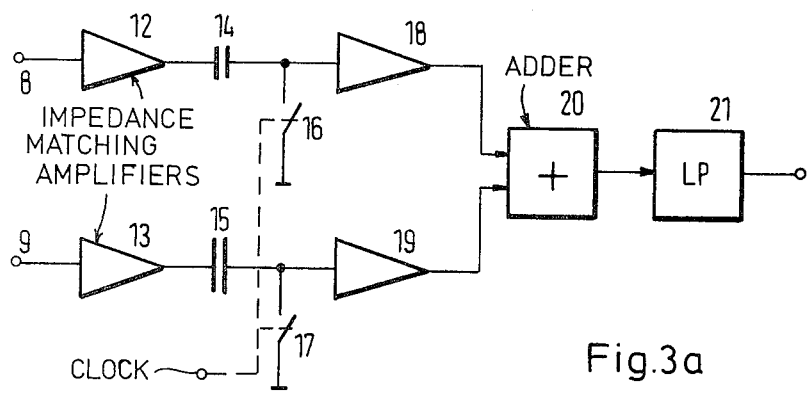
FIG. 3a is a schematic block diagram of one system to suppress low-frequency noise in video signals.
Figure 3B:
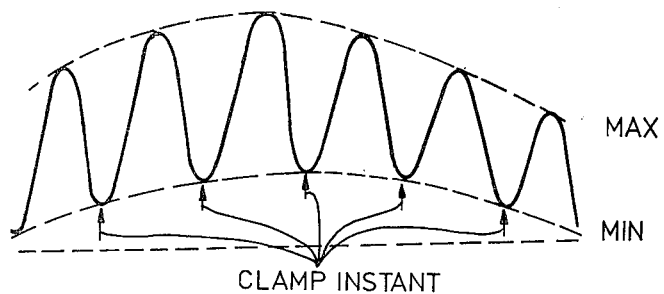
FIG. 3b is a graph illustrating the signal and how the system of FIG. 3a suppresses low-frequency noise.

FIG. 3b illustrates the output signal which will appear, for example, on one of the terminals 8, 9. This is the output signal from a semiconductor sensor, in which low-frequency noise is additively superimposed. The additive superimposition of the low-frequency noise is equally applicable to the maximum and minimum values. In accordance with the invention, the additive superimposition of the noise signal can be removed since the difference in level between the maximum and minimum values of the respective video signals from the individual cells of the sensor 1 are equally affected. The curve of FIG. 3b shows, for the three signals at the left, image areas of slightly increasing light value, whereas the two remaining signal peaks show decreasing light level. As can be seen, the maximum and minimum values of the respective signals are essentially equally affected by the noise signal.

In accordance with a feature of the invention—see FIG. 3a—the minimum level is clamped to a fixed clamping level—see FIG. 3b. The signals are applied from the output terminals 8, 9 (FIG. 1) to impedance matching amplifiers 12, 13 and then to clamping circuits including capacitors 14, 15 and switches 16, 17 which are connected to a reference level, for example ground or chassis. The switches 16, 17 are controlled to close in synchronism with the clock frequency, that is, to clamp the minimum value—see FIG. 3b—to the reference level—ground or chassis. Switches 16, 17 thus are closed each time when the respective signal has its minimum value. Amplifiers 18, 19 are connected to the coupling capacitors 14, 15, the outputs of which are added to an adder or non-additive mixer 20. The output from adder or non-additive mixer 20 is connected to a low-pass filter 21 to remove the carrier frequency components from the signal.

Figure 4:
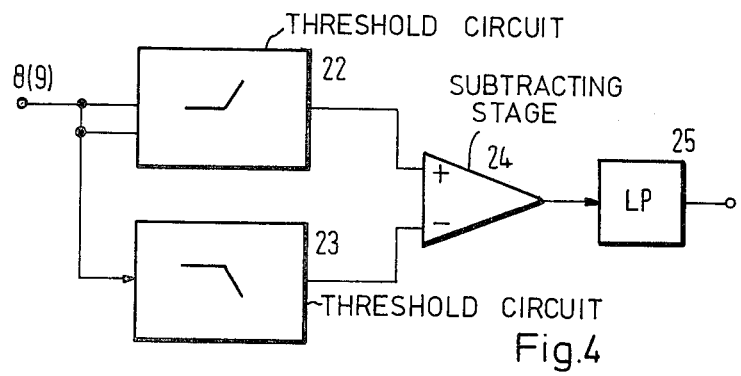
FIG. 4 is a schematic diagram of another suppression system.

Rather than using a fixed clamping level, a dynamic clamping level may be utilized. The embodiment of FIG. 4 illustrates an arrangement in which the maximum and minimum are subtracted from each other. The output signals from terminals 8, 9 are applied, respectively, to threshold circuits 22, 23, the outputs of which are connected to a subtracting stage 24 which, again, is connected through a low-pass filter to the system output. Only the difference between maximum and minimum value thus is derived from the low-pass filter 25 as the video signal.

Embodiment of FIG. 5: Separation of minimum and maximum value can be obtained not only by threshold circuits (FIG. 4) but also by utilizing non-additive mixers 26, 27. In another form, these mixers each have two transistors, as shown in FIG. 8a; in one of them, the emitters are connected to a common emitter resistor, and the bases, each, have a respective output signal from one terminal of the semiconductor sensor applied thereto. The other mixer is so connected that the transistors are of opposite conductivity, and the emitters are connected over a common emitter resistor to a common terminal supplying a voltage source, the bases, again, being connected to the respective output signals from the terminals 8, 9—see FIG. 1.

The non-additive mixers may be formed by equally polarized diodes in one of the mixers connected, respectively, to the output terminals 8, 9 and to reversely polarized diodes, in the other mixer, both diodes being connected through a common diode resistor to a source of reference potential, for example ground.

Figure 6:
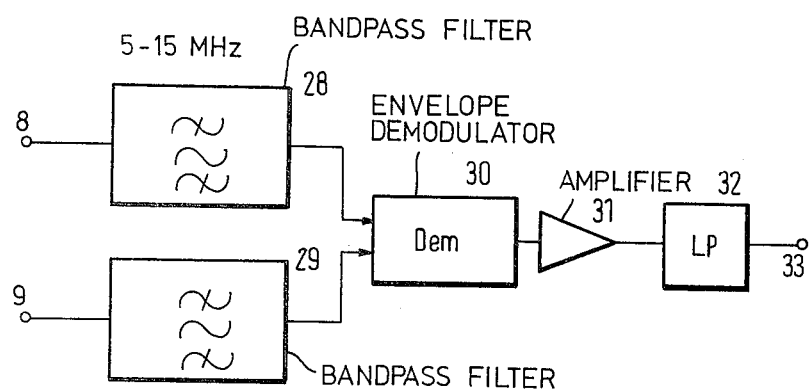
FIG. 6 is yet another embodiment of the system.

Noise, as clearly seen in FIG. 2, and also in FIG. 3b, is noticeable almost exclusively in the base band. Thus, the noise can also be suppressed by using the carrier to obtain the video signal. In the embodiment of FIG. 6, the output signals from terminals 8, 9 are applied to respective band pass filters 28, 29, having a pass range from between 5 to 15 MHz. The signals at carrier frequency are then applied to an envelope demodulator 30, the output signal of which is connected over an amplifier 31 to a low-pass filter 32 to derive an output signal at terminal 33.

Figure 7:
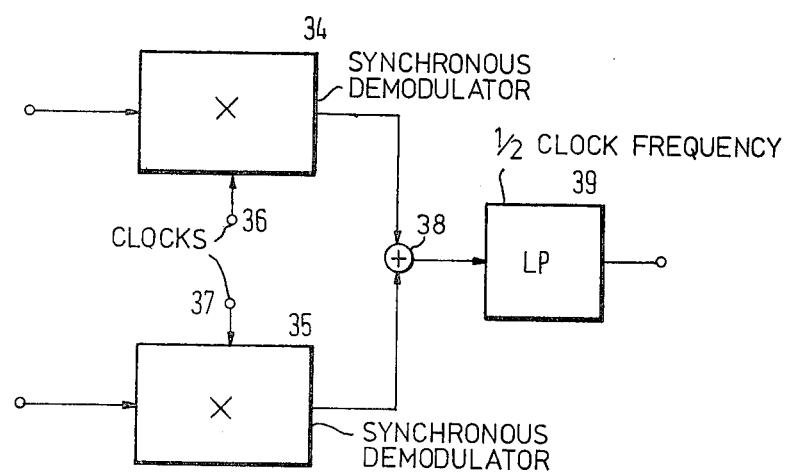
FIG. 7 is a further embodiment of the system.

The semiconductor sensors are scanned in synchronism with a clock signal. Since, thus, the carrier frequency of the scanning clock signal is available, a synchronous demodulator can simply be used in order to transform the carrier band into the base band. Thus, the respective output terminals of the semiconductor sensor are connected to synchronous demodulators 34, 35—see FIG. 7—which have clock signals applied thereto at terminals 36, 37. The outputs from the synchronous demodulators are connected to the inputs of an adder 38, the output of which is connected to a low-pass filter 39 to derive the final output from the system. Preferably, the limiting frequency of the low-pass filter 39 is about half of the clock frequency of the semiconductor sensor, that is, half of the frequency applied to the clock input 36, 37 of the synchronous demodulators 34, 35.

The embodiment of FIG. 5, utilizing non-additive mixers to separate the maximum and minimum values from the output signal, is illustrated in greater detail in—collectively—FIG. 8.

Terminals 8, 9—FIG. 8a—carry the outputs of the sensors which, in FIG. 8a, are schematically indicated as generators 51, 52. The signals applied at terminals 8, 9 are shown in graphs a1, a2. Since the shift registers 2, 3—FIG. 1—are alternatingly energized to effect shifting, the reproduced or read-out signals are correspondingly phase-shifted. FIG. 8b shows the signals schematically in triangular form, in which the upper amplitude is derived in that interval in which no information is obtained from the sensor, whereas the lower-directed amplitude corresponds to the information derived from the sensor, that is, to the brightness level of the signal. Line a1—FIG. 8b—assumes that the signal which is obtained corresponds to maximum illumination, in which "ws" corresponds to the white level signal and "bs" to the black signal, in which the signal level for the dark, non-illuminated sensor is shown only by a broken line. The signal of line a2, FIG. 8b, illustrates a signal which does not have light applied thereto, in which the level for maximum white illumination—if it were present—is shown in broken line, since it is a phantom representation.

The two signals have the noise signal superimposed thereover, which is, essentially, caused by the presence of the amplifiers 6, 7 (FIG. 1). This noise level is additive to the useful signal, and thus the signals of the minimum and maximum levels in lines a1 and a2 of the graphs of FIG. 8b change in the same sense. The illustration assumes that the noise voltage or noise signal in the two channels if of different frequency.

The two signals are applied to respective impedance matching for transformation stages, each of which has a transistor 53, 54, a base resistor 55, and an emitter-resistor 57, 58. The collectors of transistors 53, 54 are connected to the positive terminals 59 of an opening supply source of, for example, +15 V; the emitter-resistors 57, 58 are connected to terminal 60 of a negative operating source of −12 V, for example. The output of the impedance transducing and matching circuit connects the signals to a black control circuit which includes a capacitor 61, 62 and a transistor 63, 64, respectively, as well as resistors 65, 66. The black level control circuit determines the working point for the subsequent circuit. To insure a sufficiently high time constant of the black level circuit, field effect transistors (FETs) 67, 68 are connected to the outputs of the black level circuit transistors 63, 64. The FETs 67, 68 have load resistors 69, 70 connected to the bases of transistors 71, 72 which have a common emitter resistor 73, thus providing a common emitter coupling therefor.

Transistors 71, 72 operate as a non-additive mixing circuit (NAM circuit). The voltages which have a more negative instantaneous value than the ones applied to the bases of transistors 71, 72 are connected to the junction 74.

As noted above, the sensor outputs 8, 9 are energized, alternately, with respect to time. Due to this time lapse or time offset, the negative peak value of the output signal is applied alternatingly from both sensors to the junction 74. This negative peak value—as noted in the discussion in connection with FIG. 8a—forms the utilization or output signal over which the noise signal is superimposed. The voltage at junction 74 is thus identified $U_{S+N}$, in which S is utilized for the signal which is useful, and N for noise.

A similar non-additive mixing NAM circuit is formed by transistors 73', 74' and resistor 75, in which the transistors 73', 74' are of conductivity opposite that of the transistors 71, 72. The second NAM circuit thus is responsive to the positive peak value illustrated in the graph of line b of FIG. 8b. This signal includes only the noise level and thus is shown as a voltage $U_N$.

In accordance with a feature of the invention, the output voltages of the NAM circuit are to be subtracted. This is done in the operational amplifier 76 which is connected in a feedback circuit by feedback resistor 77. The inverting input of operational amplifier 76 has the voltage $U_{S+N}$ applied thereto, the direct input the voltage $U_N$. In each instance, an impedance matching or transformation network is applied between the output signals from the junction 74, 74'. The impedance matching circuit connected between junction 74 and the inverting input of operational amplifier 76 includes a transistor 78, having a base resistor 79 and emitter or load resistor 80, and a coupling resistor 81 which, preferably, is adjustable and which permits setting the amplification level of the operational amplifier 76, as well as a bias resistor 82 to apply a bias level to the inverting input of the operational amplifier. Capacitor 83 is used to block transfer of the direct voltage between the NAM circuit terminating in junction 74 and the impedance matching circuit.

The voltage $U_N$ from junction 74' is applied over coupling capacitor 84 and an impedance matching circuit similar in all essential respects to the one connected to the inverting input; the output from the impedance matching circuit of transistor 85 is connected to the direct input of operational amplifier 75. The circuit includes a base resistor 86 and a load resistor 87 connected to a source of negative supply of −12 V.

The output from operational amplifier 76 is connected over a resistor 88 to a low-pass filter 89 having a limiting frequency of about 5.5 MHz which, in turn, is connected to the output 90 of the circuit network. The low-pass filter 89 is used to filter out the scanning frequency as well as the side bands from the mixture of signals so that only the video frequency remains.

Operational amplifier 76, preferably, is a video operational amplifier, that is, an amplifier having a suitable band width.

FIG. 8b further illustrates, in line c1, the super-imposition of the two low-frequency noise portions; line c2 illustrates modulation or the utilization or useful output signal together with the two noise portions. The diagrams c1 and c2 thus, respectively, illustrate the signals $U_N$ and $U_{S+N}$. Subtracting the two signals from each other results in the output signal in line d.

Various changes and modifications may be made, and features described in connection with any one of the embodiments may be used with any of the others, within the scope of the inventive concept.

We claim:
1. Method of suppression of additively superimposed noise in a semiconductor light sensor—amplifier combination having a semiconductor light sensor element (1);
   clock signal supplying means (4, 5) respectively energizing the light sensor in accordance with clock signals for transfer of read-out signals therefrom;
   output means (2, 3) coupled to the sensor and receiving output signals therefrom varying between a maximum level, in dependence on the intensity of incident light, and a minimum level;
   and amplifier means (6, 7) amplifying the output from said output means, and providing an amplified output signal, said amplifier means introducing noise signals ($U_N$), the noise from the output means being at a frequency which is low with respect to the frequency of the clock signal, comprising, in accordance with the invention, the steps of
   sensing the maximum value of the output signal from the amplifying means which includes the signal from the sensor and an additive component respresentative of the then instantaneous noise of the amplifying means ($U_{S+N}$),
   sensing the minimum value signal;
   detecting the sensed maximum value signal and the sensed minimum value signal;
   and subtracting the detected signals from each other to thereby eliminate low-frequency shifting effects due to said low-frequency noise.
2. Method according to claim 1, including the step of clamping the minimum value signal to a fixed reference;
   and utilizing said fixed reference as a base level for the maximum value signal to thereby eliminate low-frequency shifting effects due to low-frequency noise affecting both the minimum and maximum value signals.
3. Method according to claim 1, including the step of determining a reference level comprising
   suppressing the base band of the output signals, due to said clock signals, and demodulating the carrier of the clock frequency, and the associated side bands.
4. Method according to claim 1, including the steps of determining a reference level comprising synchronously demodulating the signals derived from the amplifier means with the clock frequency of said clock signals;
   and band pass limiting the synchronously demodulated signal.
5. Method according to claim 4, wherein said band pass limiting step comprises limiting the output signals to a frequency of about half the demodulating clock frequency.
6. System for suppression of additively superimposed noise in a semiconductor light sensor—amplifier combination having
   a semiconductor light sensor element (1);
   clock signal supplying means (4, 5) respectively energizing the light sensor in accordance with clock signals for transfer of read-out signals therefrom, at a predetermined clock frequency;
   output means (2, 3) coupled to the sensor and receiving output signals therefrom varying between a maximum level, in dependence on the intensity of incident light, and a minimum level;
   and amplifier means (6, 7) amplifying the output from said output means and providing an amplified output signal, said amplifier means introducing noise signals ($U_N$), the noise from the output means being at a frequency which is low with respect to the frequency of the clock signal, comprising, in accordance with the invention, threshold circuit means connected, respectively, to said amplifier means (6, 7) to separate the minimum and maximum value signals;

and subtraction circuit means (24) connected to said threshold circuit means and establishing a reference level value based on the subtraction of the minimum level, as sensed by said threshold circuit means, from the maximum value.

7. System according to claim 6, further including switching means (16, 17) operated in synchronism with said clock signals and switching the outputs from said amplifier means (6, 7) at the time of occurrence of the minimum value, as determined by said clock signals, to a reference level to thereby clamp the minimum value signal to a constant reference voltage.

8. System according to claim 6, wherein the threshold circuit means includes non-additive mixing circuit means connected, respectively, to said amplifier means (6, 7) to supply the minimum and maximum value level signals.

9. System according to claim 8, wherein the semiconductor light sensor (1) has two outputs supplying output signals, phase-shifted with respect to each other in regard to the maximum and minimum values at said output signals, wherein two non-additive mixing circuits are provided, one, each, having an input connected to a respective output signal from the sensor, said non-additive mixing circuit having relatively opposite polarity.

10. System according to claim 9, wherein a first one of said non-additive mixing circuits comprises two transistors (71, 72), the emitters of which are connected to a common emitter resistor (73), and the bases of which are connected, respectively, to the output signals from the respective amplifier means (6, 7) connected to the respective output terminals of the light sensor element (1);

and wherein a second non-additive mixing circuit means comprises two further transistors (71', 72') of opposite conductivity type to the transistors of said first mixing circuit, the emitters of said further transistors being connected to a common emitter resistor (75) and to a source of constant reference voltage ($-12$ V), the bases of said further transistors being additionally connected to the respective output signals from said respective amplifier means and in parallel to the bases of the transistors of said first mixing circuit;

the subtraction circuit means (24; 76, 77) being connected to the outputs from the respective pairs of said transistors.

11. System according to claim 9, further including low-pass filter means (25; 89) receiving the output from said subtraction circuit means (24; 76), said low-pass filter having a filtering limit frequency in the order of about half the frequency of the clock signal.

12. System for suppression of additively superimposed noise in a semiconductor light sensor—amplifier combination having a semiconductor light sensor element (1);

clock signal supplying means (4, 5) respectively energizing the light sensor in accordance with clock signals for transfer of read-out signals therefrom, at a predetermined clock frequency;

output means (2, 3) coupled to the sensor and receiving output signals therefrom varying between a maximum level, in dependence on the intensity of incident light, and a minimum level;

and amplifier means (6, 7) amplifying the output from said output means and providing an amplified output signal, said amplifier means introducing noise signals ($U_N$), the noise from the output means being at a frequency which is low with respect to the frequency of the clock signal, comprising, in accordance with the invention, two band-pass filters having band-pass frequencies centered about the frequency of said clock signal and having a band-pass width such that the base band of the output signals is suppressed;

an envelope demodulator (30) connected to said band-pass filters and demodulating the carrier corresponding to said clock frequency and the associated side bands;

and a low-pass filter (32) connected to said amplitude demodulator and having a band pass of about half the frequency of said clock frequency.

13. System for suppression of additively superimposed noise in a semiconductor light sensor—amplifier combination having a semiconductor light sensor element (1);

clock signal supplying means (4, 5) respectively energizing the light sensor in accordance with clock signals for transfer of read-out signals therefrom, at a predetermined clock frequency;

output means (2, 3) coupled to the sensor and receiving output signals therefrom varying between a maximum level, in dependence on the intensity of incident light, and a minimum level;

and amplifer means (6, 7) amplifying the output from said output means and providing an amplified output signal, said amplifier means introducing noise signals ($U_N$), the noise from the output means being at a frequency which is low with respect to the frequency of the clock signal, comprising, in accordance with the invention, synchronous demodulator means (34, 35) having a synchronizing frequency corresponding to the clock frequency of said clock signals applied thereto;

and a low-pass filter, connected to the output of said synchronous demodulator means, the low-pass filter having an upper limit frequency corresponding to approximately half the clock frequency.

14. System according to claim 13, wherein the semiconductor light sensor has two outputs which provide maximum and minimum output values phase-shifted with respect to each other, and wherein said synchronous demodulator means comprises two synchronous demodulators (34, 35) having said clock signals applied thereto;

the amplifier means (6, 7) comprise amplifiers, respectively connected to the respective outputs from the sensor (1) and supplying their outputs to the synchronous demodulator;

an adder circuit (38) adding the outputs from said synchronous demodulators, and supplying the added output to the low-pass filter (39).

15. System for suppression of additively superimposed noise in a semiconductor light sensor—amplifier combination having a semiconductor light sensor element (1);

clock signal supplying means (4, 5) respectively energizing the light sensor in accordance with clock signals for transfer of read-out signals therefrom, at a predetermined clock frequency;

output means (2, 3) coupled to the sensor and receiving output signals therefrom varying between a maximum level, in dependence on the intensity of incident light, and a minimum level;

an amplifier means (6, 7) amplifying the output from said output means and providing an amplified output signal, said amplifier means introducing noise signals ($U_N$), the noise from the output means being at a frequency which is low with respect to the frequency of the clock signal, comprising, in accordance with the invention, extreme value responsive circuit means (22, 23; 26, 27; 71, 72, 71', 72') respectively connected to the outputs of said amplifier means and detecting the maximum and minimum levels of said maximum and minimum value signals; and difference circuit means (24) connected to said extreme value detection circuit means, and determining the difference between said signals and providing an output signal representative of said difference to thereby eliminate low-frequency components shifting said signal levels at a rate low with respect to the clock frequency of said signal.

16. System according to claim 15, further including a low-pass filter (25) connected to the output of said difference circuit means (24) and having a pass band of about half the frequency of said clock frequency.

* * * * *